US005988456A

United States Patent [19]
Laible

[11] Patent Number: 5,988,456
[45] Date of Patent: Nov. 23, 1999

[54] CLOSED LOOP DISPENSING SYSTEM

[76] Inventor: Rodney Laible, Rural Rt.1, Box 37, Bennington, Nebr. 68007

[21] Appl. No.: 09/008,110

[22] Filed: Jan. 16, 1998

[51] Int. Cl.[6] .............................. B67D 5/60; B65D 47/00; F16K 51/00

[52] U.S. Cl. .................... 222/464.1; 222/547; 251/149.4

[58] Field of Search ............................ 222/189.09, 464.1, 222/547, 482, 518; 141/346, 353, 319; 251/149.4; 137/590, 614.2

[56] References Cited

U.S. PATENT DOCUMENTS

| | | | |
|---|---|---|---|
| 2,849,163 | 8/1958 | Soffer et al. | 222/464.1 |
| 2,913,749 | 11/1959 | Ayres | 222/464.1 |
| 3,556,353 | 1/1971 | Echols | 222/309 |
| 3,951,293 | 4/1976 | Schulz | 215/261 |
| 4,159,790 | 7/1979 | Bailey | 222/211 |
| 4,445,539 | 5/1984 | Credle | 137/614.3 |
| 4,564,117 | 1/1986 | Herbert | 215/329 |
| 4,646,945 | 3/1987 | Steiner et al. | 222/207 |
| 4,673,404 | 6/1987 | Gustavsson | 604/411 |
| 4,722,450 | 2/1988 | Mario | 215/260 |
| 4,862,918 | 9/1989 | Schroeder | 137/614.17 |
| 4,863,051 | 9/1989 | Eibner et al. | 215/261 |
| 4,875,603 | 10/1989 | Weinstein | 222/205 |
| 4,886,193 | 12/1989 | Wassilieff | 222/446 |
| 4,967,922 | 11/1990 | Alder | 215/309 |
| 5,048,705 | 9/1991 | Lynd et al. | 215/1 |
| 5,082,150 | 1/1992 | Steiner et al. | 222/189 |
| 5,107,909 | 4/1992 | Donovan | 141/296 |
| 5,165,578 | 11/1992 | Laible | 222/481 |
| 5,232,110 | 8/1993 | Purnell | 215/312 |
| 5,275,310 | 1/1994 | Mielnik et al. | 222/130 |
| 5,413,152 | 5/1995 | Burrows | 141/18 |
| 5,445,186 | 8/1995 | Richter et al. | 137/614.2 |
| 5,529,223 | 6/1996 | Fisher | 222/211 |
| 5,588,565 | 12/1996 | Miller | 222/394 |
| 5,645,192 | 7/1997 | Amidzich | 222/1 |

*Primary Examiner*—Andres Kashnikow
*Assistant Examiner*—Jorge Bocanegra
*Attorney, Agent, or Firm*—Zarley, McKee, Thomte, Voorhees & Sease; Dennis L. Thomte

[57] ABSTRACT

A closed loop dispensing system for use on a liquid container such as a bottle or the like for dispensing the liquid contents from the bottle. The outlet opening of the bottle is closed by a throat plug having a valve positioned therein which is open when the container cap is mounted on the container, but which automatically closes when the cap is removed from the container. A dip tube extends downwardly from the container insert and is in communication with the valve so that liquid in the bottle may be drawn therethrough. A closure cap is mounted on the bottle and has a dispensing tube extending therefrom for dispensing liquid from the container to a mixing machine or the like. A check valve is associated with the cap for preventing backflow from the dispensing tube to the container and for permitting liquid flow from the container to the dispensing tube in response to suction being applied to the dispensing tube.

3 Claims, 3 Drawing Sheets

CLOSED LOOP DISPENSING SYSTEM

BACKGROUND OF THE INVENTION

1. Field of the Invention

This invention relates to a closed loop dispensing system and more particularly to a dispensing system for dispensing corrosive liquid chemicals or dangerous medical liquid products which are typically drawn from a container, such as a bottle or the like, to a mixing machine or the like.

2. Description of the Related Art

Corrosive liquid chemicals and dangerous medical liquid products are typically contained in a container such as a bottle or the like and are frequently dispensed therefrom to a mixing machine. Normally, a cap is placed on the bottle with a dip tube extending therefrom downwardly into the interior of the bottle for drawing the liquid upwardly thereinto. Normally, a dispensing tube extends from the cap to a mixing machine or to some other piece of equipment which creates suction in the dispensing tube to draw the liquid from the interior of the bottle. In some prior art devices, when the suction or vacuum is removed from the dispensing tube, backflow may occur. Further, when the cap is removed from the bottle, backflow from the dispensing tube may also occur. Additionally, when the cap is removed from the bottle, liquid residue in the bottle may spill therefrom. Additionally, the conventional prior art systems normally do not prevent the re-use of the bottle which is prohibited in some cases. Yet another disadvantage of the prior art is that a reliable and efficient venting means for the bottle is not normally provided for relieving vacuum pressure from within the bottle.

SUMMARY OF THE INVENTION

This invention relates to a dispensing system for use with a container, such as a bottle or the like, having an outlet opening formed in the upper end thereof. A cap is removably mounted on the container for selectively closing the outlet opening. A dispensing tube extends from the cap for dispensing liquid from the container to a mixing machine or the like. A check valve is associated with the cap for preventing backflow from the dispensing tube to the container. The check valve permits liquid flow from the container to the dispensing tube in response to suction being applied to the dispensing tube. A container insert or the throat plug is positioned in the outlet opening of the bottle and includes a valve therein which is open when the cap is mounted on the container, but which is automatically closed when the cap is removed from the container. The cap has a dispensing opening in communication with the valve in the insert for dispensing liquid from the container when the cap is mounted on the container. The insert includes a vent means for relieving pressure or vacuum in the container while preventing the escape of liquid in the container therethrough. A venting membrane covers the vent means for permitting the flow of air therethrough while preventing the flow of liquid therethrough.

It is therefore a principal object of the invention to provide an improved dispensing system for corrosive or dangerous liquids contained in a container such as a bottle or the like.

A further object of the invention is to provide a dispensing system which includes a throat plug positioned in the outlet opening of the container and which includes a valve that automatically seals the container when the container cap is removed from the container.

Yet another object of the invention is to provide a dispensing system which prevents backflow from a dispensing tube into the dispensing container.

Yet another object of the invention is to provide a dispensing system of the type described which discourages the refilling of the container after the contents have been removed therefrom.

Yet another object of the invention is to provide a dispensing system of the type described herein which includes a dispenser check valve having an umbrella valve which opens automatically under draw-off pressure and closes when pressure is removed, eliminating reverse flow from the dispensing tube.

Still another object of the invention is to provide a dispensing system which is safe and convenient to use.

These and other objects will be obvious to those skilled in the art.

BRIEF DESCRIPTION OF THE DRAWINGS

FIG. 1 is a partial perspective view of the closed loop dispensing system of this invention mounted on a container such as a bottle or the like;

DESCRIPTION OF THE PREFERRED EMBODIMENT

Figure 2:
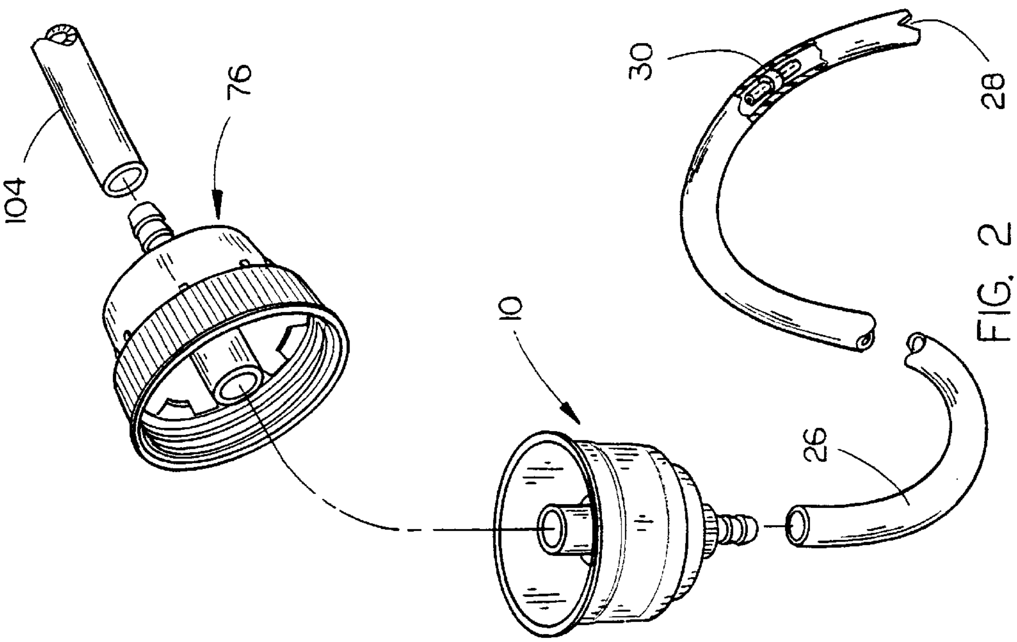
FIG. 2 is a partially exploded perspective view of the closed loop dispensing system of this invention.
Figure 1:
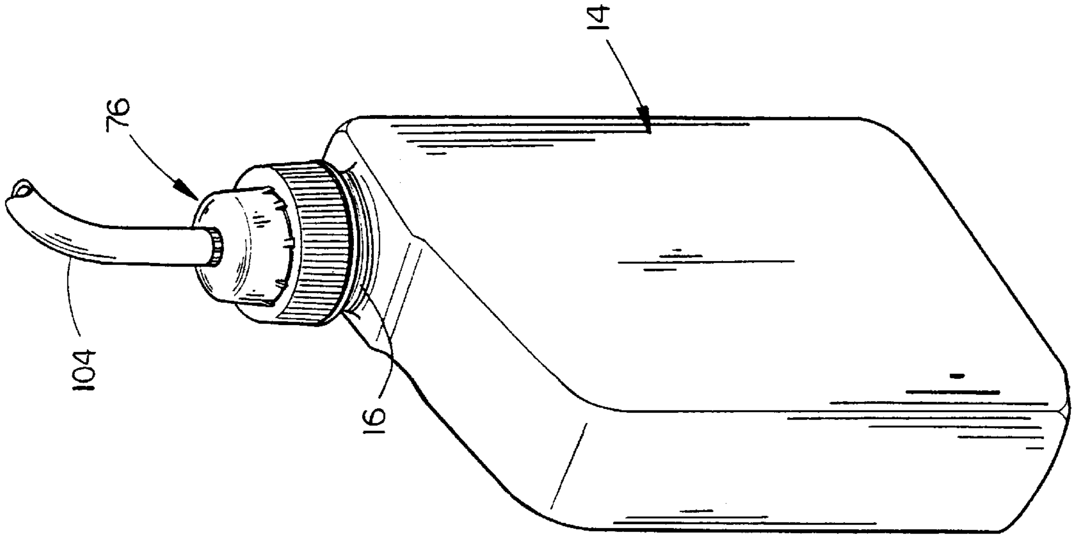

The numeral 10 refers to a throat plug assembly which is press-fitted into the throat or outlet opening 12 of a container 14 such as a bottle or the like. Preferably, throat 12 includes external thread 16. Assembly 10 includes an externally threaded disc member 18 having a plurality of openings 20 extending therethrough. The upper ends of openings 20 communicate with an annular groove 22 formed in the upper surface of disc member 18. Disc member 18 includes external threads 19 for a purpose to be described hereinafter. Hollow dip tube support 24 extends downwardly from disc member 18 and has the upper end of a curved dip tube 26 mounted thereon which extends downwardly into the bottle 14 and which has a length sufficient so that it may extend into a bottom corner of the bottle. The lower end of dip tube 26 is provided with notches 28 formed therein so that all of the liquid in the bottle 14 may be drawn into the lower end of the dip tube 26. Preferably, a conventional metering insert 30 is provided in dip tube 26. The numeral 32 refers to a hollow valve body which is integrally formed with disc-shaped member 18 and which is in communication with the interior of dip tube support 24. The upper end 34 of valve body 32 is closed, as seen in the drawings. The side wall of valve body 32, below the upper end 34, is provided with a pair of openings 36 formed therein to permit the liquid being drawn from the bottle 14, through dip tube 26, to pass through valve body 32, as will be described in detail hereinafter.

Figure 4:
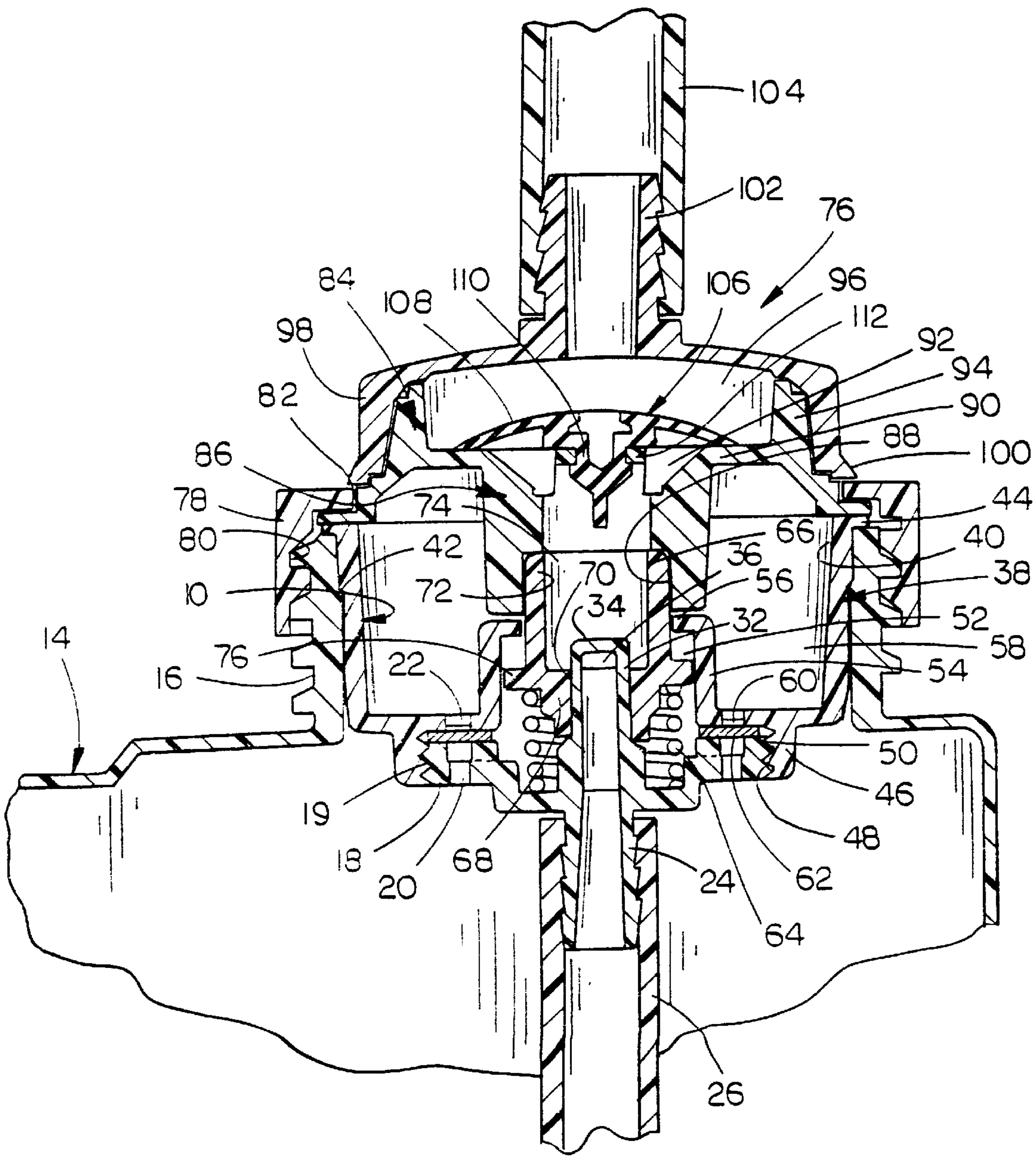
FIG. 4 is a vertical sectional view of the assembled system of this invention.

Throat plug assembly 10 also includes a tapered, cup-shaped plug 38 which is inserted into the throat 12 of the bottle 14, as seen in FIG. 4. Plug 38 includes a tapered wall 40 preferably including conventional retention rings 42 on the outer surface thereof to yieldably maintain plug 38 in throat 12. Wall 40 also includes an outwardly extending lip 44 on the upper end thereof for limiting the downward movement of plug 38 with respect to bottle 14.

Plug 38 includes an annular shoulder 46 at its lower end which has internal threads 48 provided thereon for threadably receiving disc member 18. Shoulder 46 also defines an annular recess 50 which extends around a central opening 52 formed in the upstanding, cylindrical receiver 54. Receiver 54 is provided with an inwardly extending lip 56 at its upper end. Receiver 54 has a diameter less than the inside diameter of wall 40 to define an annular recess 58 therebetween. Plug 38 also includes a plurality of vent openings 60 formed in the bottom thereof which extend between recess 50 and recess 58. Venting membrane 62 is received in recess 50 for permitting the passage of air therethrough while preventing the passage of liquid therethrough. As stated, disc member 18 is threadably secured to the lower end of plug 38 so that valve body 32 extends upwardly into receiver 54. As seen, the upper end 34 of valve body 32 is positioned below the upper end of receiver 54.

Spring 64 loosely embraces valve body 32 and is positioned between disc member 18 and valve stem 66. Valve stem 66 is generally cylindrical and includes a lower, cylindrical body portion 68 having bore 70 formed therein which slidably receives valve body 32 therein. Valve stem 66 also includes an upper tapered, cylindrical body portion 72 having bore 74 formed therein. Bore 74 has a greater diameter than bore 70, as seen in FIG. 4. Annular shoulder 76 extends outwardly from valve stem 66 between body portions 68 and 72 for engagement with the upper end of spring 64. Valve stem 66 extends upwardly through receiver 54 so that the upper end of body portion 72 is positioned above the upper end of receiver 54. The upper end of spring 64 is in engagement with the underside of shoulder 76 of valve stem 66. Spring 64 normally, yieldably urges valve stem 66 upwardly with respect to receiver 54 so that body portion 68 closes the openings 36 in the valve body 32 to prevent the flow of liquid from the bottle 14 through the throat plug assembly 10. When valve stem 66 is moved downwardly to its lowermost position, as will be described hereinafter, against the spring force of spring 64, the openings 36 are not closed by body portion 68 so that liquid may pass from the interior of valve body 32 into the interior of bore 74.

The numeral 76 refers to the cap portion of this invention. Cap 76 includes a locking collar 78 having internal threads 80 which are adapted to be threadably connected to threads 16 on bottle 14. Collar 78 is provided with a central opening 82 formed therein which has receiver assembly 84 positioned therein which includes a cylindrical receiver 86 extending downwardly therefrom. Receiver 86 has a tapered bore 88 formed therein, the lower end of which is adapted to receive the tapered body portion 72 of valve stem 66. The relationship of tapered bore 88 and tapered body portion 72 provides a seal therebetween and causes receiver 86 to move valve stem 66 downwardly from its upper closed position to its lower open position when collar 78 is screwed onto threads 16 of bottle 14.

Receiver assembly 84 also includes an annular rim portion 90 having a plurality of spaced-apart openings 92 formed therein. Further, receiver assembly 84 includes an upstanding, annular body portion 94 defining a compartment 96. Cup-shaped cap member 98 is snap-fitted onto body portion 94 above collar 78, as seen in FIG. 4, and has a plurality of retention member 100 extending outwardly therefrom which are positioned above the upper end of collar 78. Dispensing tube support 102 extends upwardly from cap member 98 and has dispensing tube 104 mounted thereon which extends to a dispenser, mixer, etc.

The numeral 106 refers to a flexible umbrella valve which is positioned in compartment 96, as illustrated in the drawings. Umbrella valve 106 includes body portion 108 and a central shank portion 110. Shank portion 110 is supported upon the spaced-apart fingers or tabs 112 provided on the upper end of receiver 86. Normally, umbrella valve 106 seals the upper open end of receiver 86 to prevent the flow of liquid from tube 104 when the cap assembly is removed from bottle 14. When the cap assembly is screwed onto bottle 14 having the throat plug assembly 10 mounted therein, liquid may pass upwardly around the peripheral edges of body portion 108 and into tube 104 when suction or vacuum pressure is applied to tube 104.

In operation, the closed loop dispensing system of this invention is used in connection with a container 14, such as a bottle or the like, when the dispensing tube 104 is connected to a mixing machine or the like which creates a suction or vacuum in the dispensing tube 104. When the mixing machine applies suction to dispensing tube 104, the flexible umbrella valve 106 opens in response thereto. The valve stem 66 will have been previously moved to its “open” position when the cap portion 76 is placed on the bottle. Liquid from the container 14 is drawn upwardly through the curved dip tube 26 by the metering insert 30 and into the bore 74 inasmuch as the openings 36 are in communication therewith due to the fact that valve stem 66 has been moved downwardly to its open position, as previously described. The interior of bore 74 then is permitted to bypass the umbrella valve 106 and travels into the interior of the dispensing tube 104.

Figure 3:
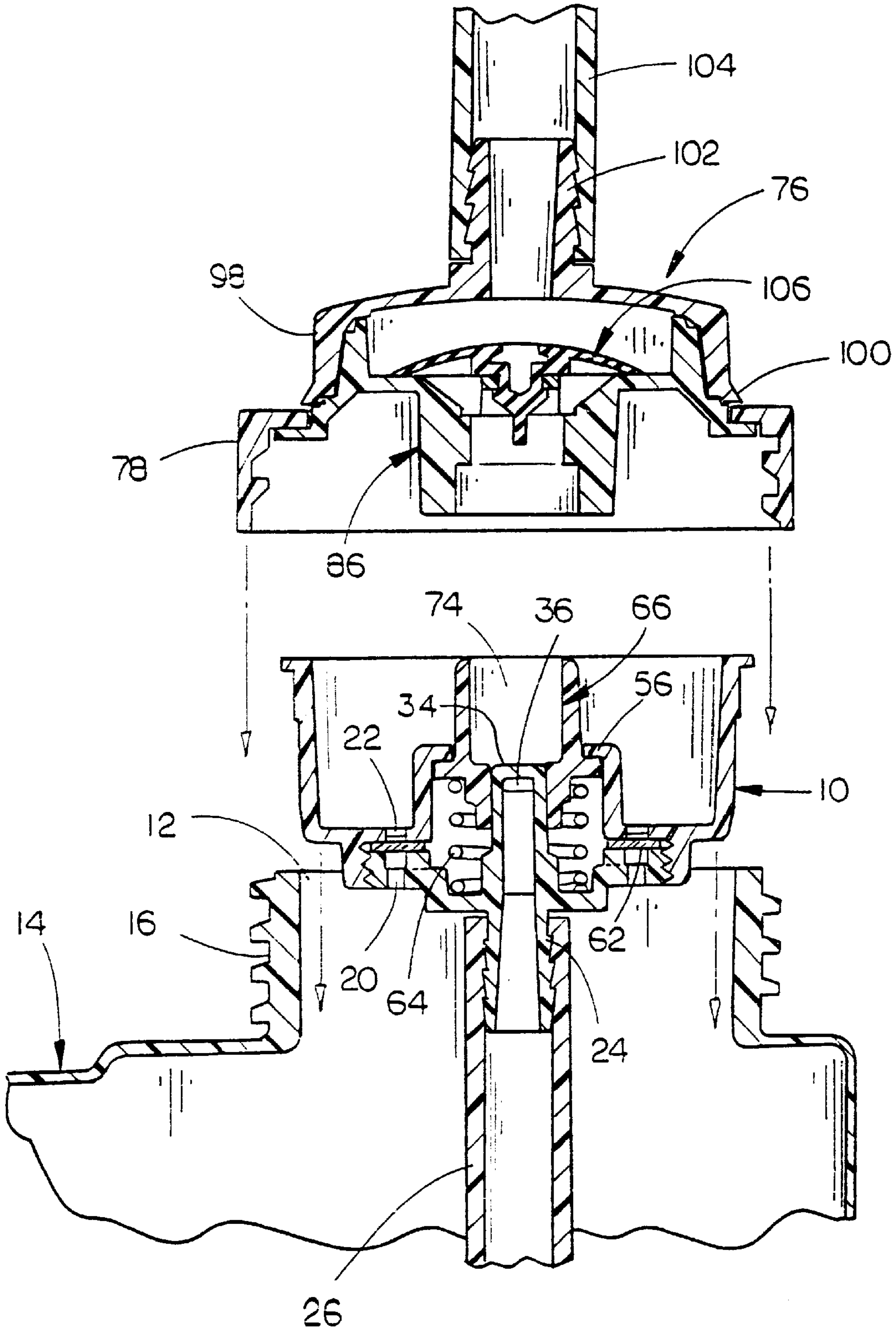
FIG. 3 is a vertical sectional view of the closed loop dispensing system of this invention in an exploded view.

When the cap is removed from the container 14, the umbrella valve 106 prevents backflow from the dispensing tube 104, since the umbrella valve 106 seals the open end of receiver 86. The removal of the cap from the bottle causes the spring actuated valve stem 66 to close inasmuch as the valve stem 66 is moved upwardly to the position illustrated in FIG. 3 so that the openings 36 are closed by the valve body 68 which prevents liquid from passing from the interior of valve body 32 into the interior of bore 74. The venting membrane 62 permits gas pressure or vacuum in the bottle to dissipate when the cap has been removed from the container. When the cap is on the container, the venting membrane 62 allows venting of gas, but not liquid, to relieve gas pressure or vacuum in the bottle, but stops liquid flow such as if the bottle tips over.

Thus it can be seen that an improved dispensing system has been provided for corrosive or dangerous liquids contained in a container such a bottle or the like and which includes a throat plug positioned in the outlet opening of the container having a valve that automatically seals the container when the container cap is removed from the container. It can also be seen that the dispensing system of this invention prevents backflow from the dispensing tube into the dispensing container and which discourages refilling of the container after the contents have been removed therefrom. It can also be seen that the dispensing system of this invention includes an umbrella valve which opens automatically under draw-off pressure and which closes when pressure is removed, thereby eliminating reverse flow from the dispensing tube.

Accordingly, it can be seen that the invention accomplishes at least all of its stated objectives.

I claim:

1. In combination, a liquid container having upper and lower ends;

said container having a hollow throat extending upwardly therefrom which has interior and exterior surfaces;

a throat plug assembly, having upper and lower ends, positioned in said throat of said container;

said throat plug assembly having an upstanding, hollow valve body, having upper and lower ends, at the lower end thereof;

said valve body having an upstanding hollow receiver, including upper and lower ends, above the lower end thereof which has a central opening formed in the upper end thereof;

said valve body having at least one opening formed therein below the upper end thereof;

a dip tube in communication with said lower end of said valve body and being in communication with the liquid in said liquid container;

said valve body being at least partially positioned within said hollow receiver;

a valve vertically movably mounted on said valve body which is movable between an upper closed position to a lower open position;

said valve being movably positioned in said central opening of said hollow receiver to close said opening in said valve body when said valve is in its said upper closed position and to open said opening in said valve body when said valve is in its lower open position;

said valve, when in its said lower open position, permitting flow of liquid through said dip tube upwardly through said valve body into the interior of said valve;

a spring in said throat plug assembly which urges said valve into its said upper closed position;

said spring being positioned in said throat plug assembly so that the liquid passing through said valve body, said valve and said receiver does not come into contact with said spring;

a cap removably mounted on said throat of container for selectively closing said throat;

a dispensing tube extending from said cap for dispensing liquid from said container;

a check valve associated with said cap for preventing backflow from said dispensing tube to said container and which permits liquid flow from said container to said dispensing tube in response to suction being applied to said dispensing tube;

said cap including means for engagement with said valve to move said valve downwardly to its said lower open position when said cap is mounted on said container to close said throat.

2. The combination of claim 1 wherein said check valve comprises a normally closed flexible umbrella valve which opens in response to suction being applied to said dispensing tube.

3. The combination of claim 1 wherein said throat plug assembly includes a first vent means for relieving pressure or vacuum in said container, but which prevents escape of liquid in said container therethrough.

* * * * *